United States Patent [19]

Hedtke

[11] Patent Number: 4,653,330
[45] Date of Patent: Mar. 31, 1987

[54] PRESSURE TRANSMITTER HOUSING

[75] Inventor: Robert C. Hedtke, Hamburg, Minn.

[73] Assignee: Rosemount Inc., Eden Prairie, Minn.

[21] Appl. No.: 755,284

[22] Filed: Jul. 15, 1985

[51] Int. Cl.[4] .......... G01M 7/08; G01M 9/12; G01M 13/06; G01M 19/14
[52] U.S. Cl. .......... 73/756; 73/431; 73/718; 73/724; 361/283
[58] Field of Search .......... 73/431, 720, 721, 726, 73/727, DIG. 4, 715, 716, 717, 718, 719, 722, 723, 724, 725, 728, 729, 756; 338/4, 42; 361/283

[56] References Cited

U.S. PATENT DOCUMENTS

| 3,247,719 | 4/1966 | Chelner | 73/756 |
| 3,618,390 | 11/1971 | Frick | 73/718 |
| 4,176,557 | 12/1979 | Johnston | 73/756 |
| 4,414,851 | 11/1983 | Maglic | 73/756 |
| 4,460,290 | 7/1984 | Mallet | 403/373 |

OTHER PUBLICATIONS

Bourns Instruments, Inc. pamphlet, 6 pages.
Pressure Transducer Type 4-351 pamphlet, by Bell & Howell, 2 pages.
Model 1151 DP Alphaline Differential Pressure Transmitter, Product Data Sheet 2256 by Rosemount Inc., 6 pages.
Model 5020 pamphlet, by Bournes, 2 pages.

Primary Examiner—Donald O. Woodiel
Attorney, Agent, or Firm—Kinney & Lange

[57] ABSTRACT

A pressure transmitter housing for mounting an internal sensing cell, and having two sections that provide integral pressure connecting flanges for differential pressure sensing, and provide proper clamping pressure and seals on the sensing cell. The housing sections also provide a space for all transmitter circuitry in a toroidal chamber defined in the housing and surrounding the sensing cell. Each of the housing sections has a sealing surface for sealing against the outer ends of a differential pressure sensing cell, and clamping the ends of the cells together under compressive load using external clamping bolts. One of the housing sections has a terminal strip to connect to external power supply wires. The housing sections are easily cast and machined, and will accommodate the necessary dimensional tolerances needed for manufacturing processes in making the sensing cells. Low cost manufacturing is achieved by combining the function of the sensing cell clamp in flanges and circuit housing and at the same time providing the necessary pressure connection flange functions.

11 Claims, 4 Drawing Figures

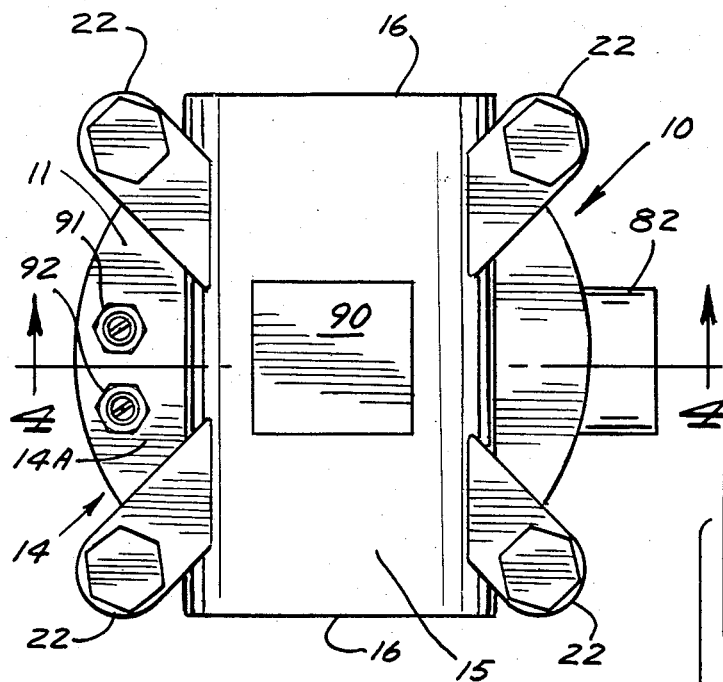
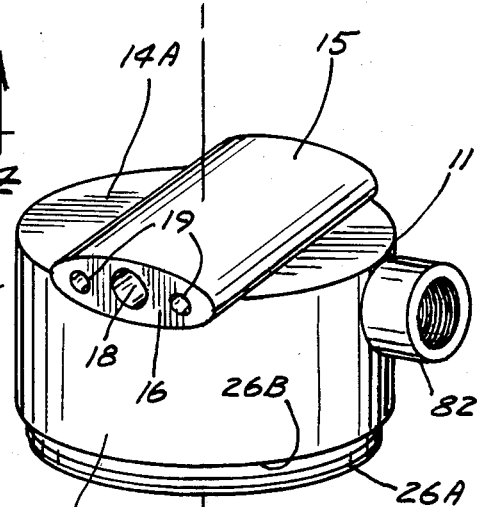
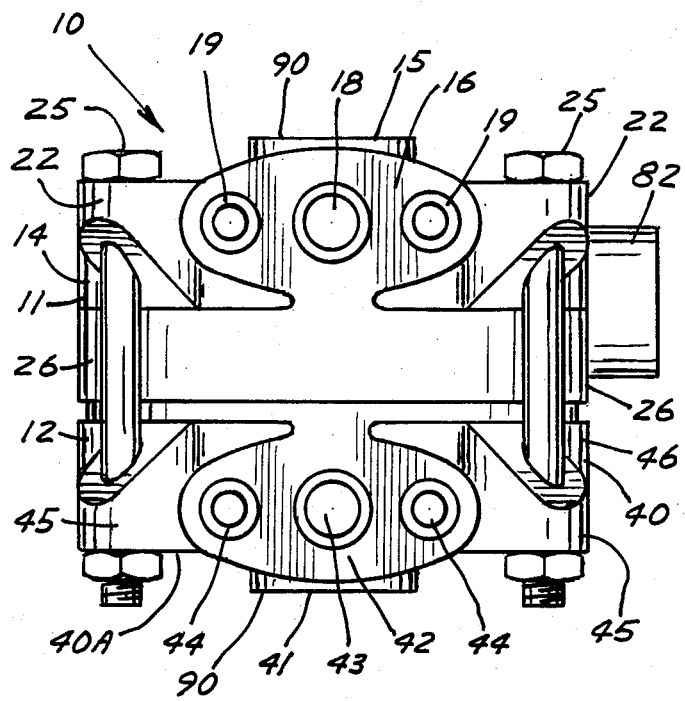
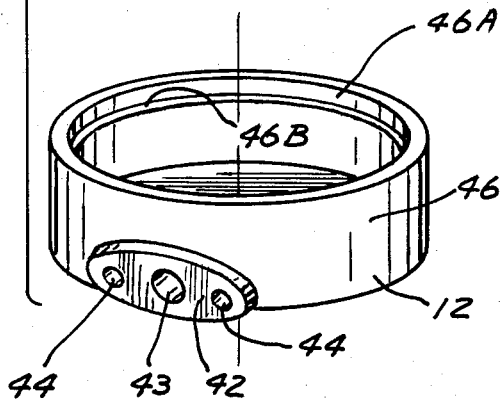

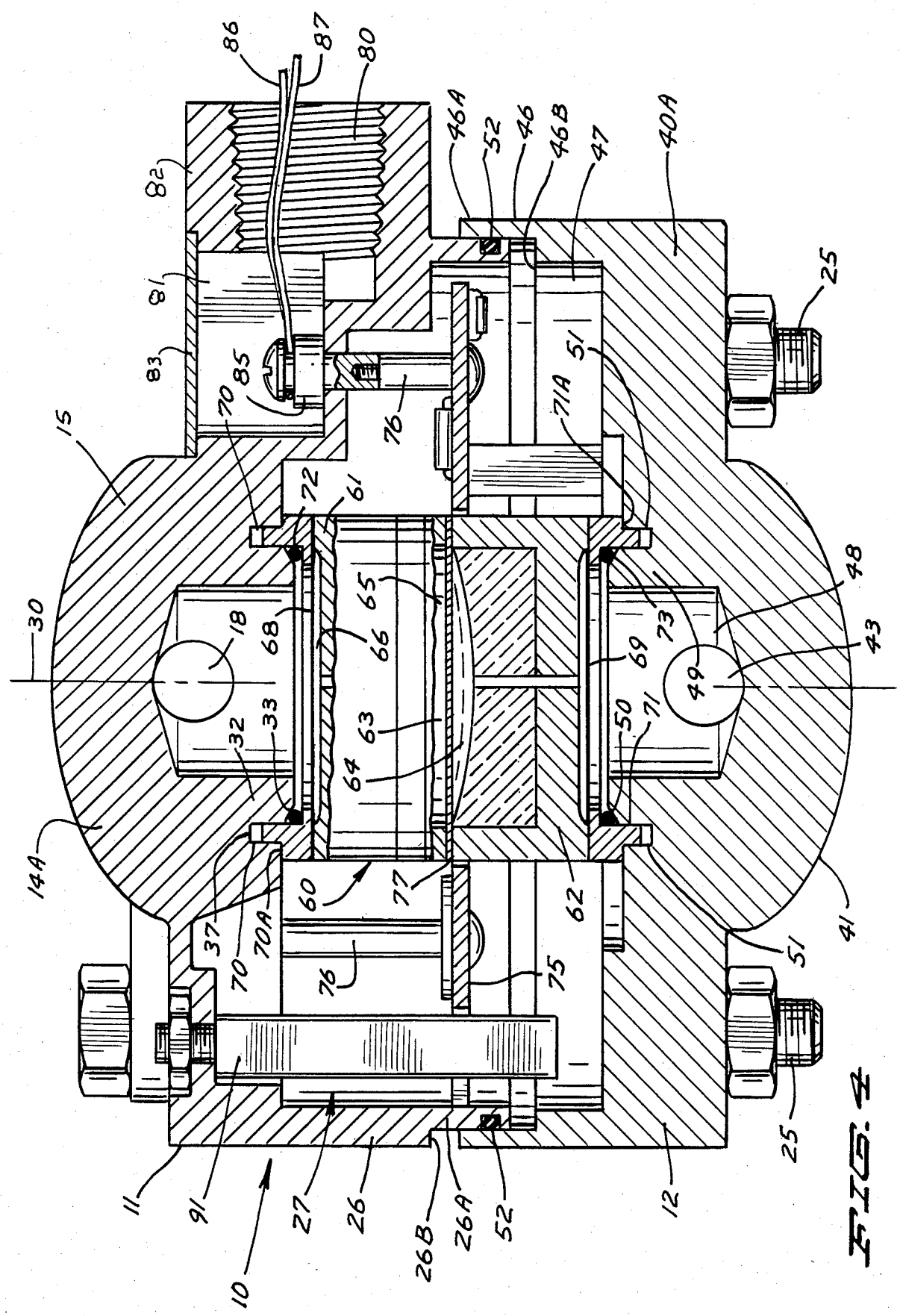

PRESSURE TRANSMITTER HOUSING

BACKGROUND OF THE INVENTION

1. Field of the Invention.

The present invention relates to housings for pressure sensing cells and associated signal conditioning and transmitter circuitry.

2. Description of the Prior Art.

Conventional differential pressure transducers incorporate a sensor cell that has flanges that permit connecting the sensor to two separate sources of pressure, and generally are used for clamping the sensor. For example, flanges for clamping a sensing cell are shown in U.S. Pat. No. 4,466,290. This patent also shows a system for attaching a manifold in position. In such a device as shown in this patent, and also in U.S. Pat. No. 3,618,390, the flanges are used for clamping the sensing cell, and a separate housing is utilized for the signal conditioning circuitry, preferably a two wire transmitter circuit. The separate housing increases cost, and while it isolates the circuitry from the sensing cell mounting, in many applications where low cost transmitters are desirable, and where the specifications for operation are not as critical as others, it is desirable to minimize the number of parts, and yet provide all of the functions of existing transmitters.

Bourns Instruments, Inc. of Riverside, California also sells differential pressure transmitters. Their Models 8100 and 8400 show transmitters having separate circuit or convertor circuitry housings as well as flanges for connection to the pressure sources.

Bourns Instruments, Inc. Model 5020 solid state differential pressure transmitter also shows a housing that has end flanges fastened to a body with cap screws, but in this instance the circuitry used with the unit is housed in a separate portion of the housing extending laterally from the main part of the housing.

The CEC Division of Bell and Howell makes a pressure transducer type 4-351 which utilizes a strain gage type sensor inside a housing having flanges at its ends, and circuitry within the housing. In such a unit, however, it is not necessary to provide clamping to the sensor, and thus the end members for the housing are merely fastened onto the center section with cap screws. This is a small solid state unit, using a strain gage sensing cell.

SUMMARY OF THE INVENTION

The present invention relates to a sensing cell and transmitter housing that serves the function of pressure connecting flanges as well as a housing a sensing cell or sensor and associated circuitry. The housing has two sections with integral flange portions that provide sufficient rigidity to clamp a sensing cell in position for withstanding pressures applied to the cell. The housing sections are held together with bolts for fastening the two housing sections together. The signal conditioning and transmitter circuitry associated with the sensing cell is arranged on a toroidal circuit board that encircles the sensing cell and is entirely within the housing once the housing is assembled. The integral flanges on the housing sections provide passageways for the process fluids to be sensed by the sensing cell, and also provide the necessary strength for withstanding the internal line pressures on the sensing cell.

The housing essentially has integral flanges that permit the clamping of the sensing cell together, as shown, and all of the circuitry needed to produce a 4 to 20 milliamp, two-wire DC current output signal is within a housing chamber formed between the flanges. A terminal strip connector is provided on one of the housing sections. The interfitting edges of the housing sections provide tolerance in accommodating variation in length of the sensing cell that is being clamped. The output connections are provided through a connector neck on one of the housing sections, and a small cover provides access to the terminals for connection to external wires used with the two-wire circuit. The circuit board on which the components for the transmitter are mounted around the sensing cell within the housing chamber.

BRIEF DESCRIPTION OF THE DRAWINGS

FIG. 1 is a top plan view of a pressure transmitter housing made according to the present invention;

FIG. 2 is a side elevational view of the device in FIG. 1;

FIG. 3 is a schematic, exploded representation of the internal components and external members of the transmitter housing of the present invention; and FIG. 4 is an enlarged sectional view taken as on line 4—4 in FIG. 1.

DETAILED DESCRIPTION OF THE PREFERRED EMBODIMENTS

As shown in FIGS. 1 and 2, a pressure transmitter indicated generally at 10 is made up of two combined integral flange and housing sections 11 and 12, respectively. The housing section 11 has a cup-shaped body portion indicated generally at 14 with a closed end wall 14A an inlet manifold and flange 15 on the closed end wall of the cup portion 14. The inlet manifold 15 has mounting flange face surfaces 16 at opposite ends of the inlet manifold 15 that are identically shaped, and each includes an inlet passageway 18 defined in the inlet manifold, and threaded bores 19 for connecting a pressure fitting for the pressure to be sensed. The inlet passageways in the face surfaces 16 that are not in use are plugged or fitted with vent-drain valves. Thus, either end of the inlet manifold 15 can be used. Threaded bores 19 may also be used to mount the transmitter housing to a mounting bracket.

Additionally, a plurality of bolt mounting ears 22 are integrally formed with the inlet manifold portion 15 and the closed end 14A of the cup portion 14, and extend radially so that the ears 22 are sufficiently outside the periphery of the cup portion 14 to permit mounting bolts 25 to pass through provided openings in the ears and clear the skirt 26 of the cup portion 14 of housing section 11. The cup portion 14 defines an interior chamber 27 within the skirt 26 of desired diameter and depth. The chamber 27 is configured on the interior as desired, but the portion of the chamber 27 opposite the closed end is of sufficient diameter and size to suitably mount a circuit board for necessary circuitry, as will be explained.

A counterbore 31 is drilled into the interior surface of the closed end 14A of the cup 14 along the central axis of the transmitter housing, indicated at 30 in FIG. 4. Counterbore 31 intersects the crossbore 18 to provide a passageway for pressure from the bore or pressure inlet 18 to counterbore 31, and thus to the interior chamber 27. The counterbore 31 is surrounded by a neck 32 that has a tapered or chamfered edge surface 33 around its outer edge. This neck is also surrounded by an annular groove 37 that is counterbored into the internal surface of the closed end 14A.

The housing section 12 includes a cup portion 40, having a closed end 40A on which an inlet manifold and flange 41 is formed in the same manner as the manifold 15. As can be seen in FIG. 2, the manifold 41 has face surfaces 42, shown, and an opposite face surface formed at the opposite end of the inlet manifold 41 in the same manner as the face surfaces 42 are formed. There is a bore 43 in the manifold 41 opening to the face surfaces 42 that provides a pressure inlet passageway. Threaded openings 44 are provided on face surface 42 for receiving cap screws to clamp a flange member for the pressure inlet connection onto one face surface 42 of the manifold 41

The closed end 40A of cup portion 40 also includes integrally mounted ears 45, through which the cap screws 25 pass. These ears 45 align with the ears 22 of the housing section 11.

The cup portion 40 has an annular skirt 46 forming the walls of the cup portion, and the skirt defines an interior chamber 47 corresponding to the chamber 27 on the housing section 11. The housing section 12, at the closed end 40A of the cup member 40, has a counterbore 48 defined therein which is coaxial with the central axis 30 and aligned with the counterbore 31. The passageway 43 opens in the counterbore 48, and the counterbore 48 is surrounded with a neck 49 that has a chamfered surface 50 around the outer edge thereof. An annular groove 51 is defined around the neck 49 and partially in the surrounding surface of the closed end 40A of the cup portion 40.

The lower portion of the skirt 26, shown at 26A, has a shoulder 26B defined therein around its periphery. The skirt 46, shown in FIG. 4 and indicated at 46A, has a recess forming a shoulder 46B therein. The two housing sections 11 and 12, and, in particular, the skirt portions 26A and 46A will telescope together, and slide relative to each other along the central axis 30. The skirt portion 26A has an O-ring groove therein which mounts an O-ring 52 that is compressed when the two housing sections telescope together, and seals against the inner surface of the skirt portion 46A.

The transmitter housing sections 11 and 12 are used for forming combined integral housing and flange members for providing pressure to be sensed by a sensing cell or sensor indicated generally at 60. The sensing cell 60 is of conventional design, and, as shown, is a capacitive type sensor for sensing differential pressure, generally as shown in U.S. Pat. No. 3,618,690. The sensing cell 60 is made up of two cup sections 61 and 62 that have chambers filled with an insulating material (such as glass) and which have chambers 63 and 64 defined therein, respectively. These chambers are separated by a deflecting or sensing diaphragm 65. The diaphragm 65 is a stretched diaphragm, and will deflect toward the surfaces defining the chamber 63 and 64 depending on the pressure difference between the opposite surfaces of the diaphragm. In the form shown, the surfaces of chambers 63 and 64 facing the diaphragm 65 are coated with a suitable conductor to form a pair capacitive plates used in combination with the diaphragm 65. The chambers 63 and 64 are filled with an incompressible fluid and are fluidly connected to isolation chambers 66 and 67, respectively. Isolation chambers 66 and 67 are closed on the outer ends of the sensing cell 60 with isolation diaphragms 68 and 69. The isolation diaphragms 68 and 69 have surfaces thereon that are, as shown in FIG. 4, open to the respective counterbores 31 and 48, which are connected to separate sources of pressure.

The cup sections 61 and 62 of the sensing cell 60 have rim members 70 and 71 around the outer peripheries thereof at opposite ends of the sensing cell. The rim members 70 and 71 fit into the grooves 37 and 51 when the two housing sections are placed together over the sensing cell. The rim members 70 and 71 define rim shoulders 70A and 71A that abut on the closed ends of the housing section cups surrounding the grooves 37 and 51 when the housing sections are clamped together. O-rings 72 and 73 are provided on the opposite ends of the sensing cell within the rings and these O-rings engage the respective chamfered surfaces 33 and 50. As the two housing sections telescope together, the surfaces 33 and 50 will compress the O-rings 72 and 73 before the shoulders 70A and 71A abut the surfaces surrounding the grooves 37 and 51. The sensing cell 60 is clamped between the end walls of the respective end caps. The O-rings 72 and 73 will be compressed to form a seal to prevent fluid present in the counterbores 31 and 48 from the separate sources of pressure from leaking into the chambers 27 and 47.

The isolation diaphragms 66 and 67 will deflect under differentials in pressure causing the diaphragm 65 to deflect which changes capacitance of the capacitors formed. The capacitors will indicate the differentials in pressure thereby providing electrical signals when connected to appropriate circuitry.

It can be seen that the static line pressure, that is the average of the pressures in the bores 18 and 43, will be exerted on the interior of the sensing cell and also will act on the isolated diaphragm 68 and 69. The force tends to separate the housing sections 11 and 12. This requires clamping of the housing sections tightly against the sensing cell to prevent the housing sections and the sensing cell section from separating. The bolts 25 are used for tightening the housing sections onto the sensing cell and loading it in compression. The bolts 25 resist bowing or warping movement of the housing sections under pressure.

In the present invention, the two housing sections also define chambers for housing the electronic converter circuitry, as well as providing the flanges for pressure connection. As shown, the two chambers 47 and 27 form one large chamber when the two housing sections are placed together. An annular or toroidal circuit board 75 is mounted on suitable studs 76 to the housing section 11 so as to surround the sensing cell 60. The circuit board 75 has an opening 77 in its center of a size sufficient to permit the sensing cell to pass therethrough. The toroidal circuit board 75 mounts all of the circuit components necessary for providing the excitation to the capacitor plates formed in the sensing cell 60, as well as mounting the components for the transmitter circuitry that changes this capacitance signal into a proportional DC current signal representing the diaphragm deflection.

The housing is formed economically, by combining the flanges integrally with the housing sections for the circuit. Looking at the construction in another way, the flanges are formed with an integral housing for the electronic circuitry and the sensing cell or sensor.

The housing section 11 is provided with a terminal block chamber indicated generally at 81. A conduit fitting 80 is formed inside a collar 82 that opens to the chamber 81. A cover plate 83 is fastened in place with suitable small screws to cover the opening to the chamber 80. A terminal block 85 is provided in the chamber 80 providing the leads from the circuit on the circuit board 75 to external wires, indicated at 86 and 87, leading to a two-wire circuit.

The combined housing and flanges permit the mounting of electrical components without having a separate housing for the circuit or separate terminal block strips on the exterior of the housing.

The chamber 27 is made large enough to provide an adequate size toroidal circuit board so that it fits immediately around the sensing cell 60. The clamping action of the housing sections acts similarly to flanges used on previous sensing cells of substantially identical construction, but fully incorporates the needed housing space for all of the electrical circuit components for a two wire transmitter circuit.

In the exploded view of FIG. 3, it can be seen schematically how the housing sections fit over the sensing cell 60. The entire sensing cell fits in the opening through the circuit board 75. The housing section 12 has the skirt portion 46A that fits over the skirt portion 26A of the housing section 11 so that the bolts that are used can clamp the units together.

In certain instances where only lower pressures will be sensed, the housing sections can be made with interfitting telescoping skirts. The housing sections can then be permanently affixed together by welding or with cement or adhesive as desired.

The flanges, however, are integral with the housing at the closed ends of the cup portions forming the chambers for the housing for the circuit board. Clamping surfaces are provided on the interior of the housing section for holding the pressure sensing cell together.

It should be noted that large pressures will tend to bow the housing sections apart, and adequate strength is required to resist the deformation across the design range. The dimensions of the housing sections are dependent on the physical size of the interior sensing cell that they hold, as well as the need for room for the electronics. The versatility of the housing comes from the many functions that are performed. The housing sections provide an environmental housing for both the electronics and the sensing cell or sensor. The housing sections also provide a mechanical clamping force to the sensing cell to prevent separating forces from exceeding the design level of the welds that normally hold the sensing cell parts together. The housing sections also provide a pressure seal for the inlet fluid, and the wetted parts connection, that is the surfaces for attaching the input pressure connectors carrying the fluids to be sensed. A preload force is applied to bosses 90 while bolts 25 are tightened to provide a desired level of clamping force between housing sections 11 and 12.

Additionally, by having the electronics for the entire transducer circuitry located on a circuit board that surrounds the sensing cell, there wiring lengths are reduced and even though it has been known to locate some components near the sensing cell, the stray capacitance signals can be reduced substantially in a capacitance sensing cell by having the circuit board adjacent to the capacitive plates.

Potentiometers 91 and 92 are sealed potentiometers electrically connected to the electronics on circuit board 75. Potentiometers 91 and 92 provide a means for adjusting parameters such as zero and span in a two-wire 4–20 milliamp circuit. The potentiometers are adjustable without opening the housing. While the output has been described as a two-wire output, other outputs may be provided within the scope of this invention.

What is claimed is:

1. A pressure transmitter for providing an output signal representative of an input pressure signal of a process fluid comprising:
   sensor means for sensing the input pressure signal and providing a sensor signal, the sensor means having a first circular sealing means surrounding a diaphragm for isolating the sensor from the process fluid;
   converter circuit means disposed toroidally about the sensor means for receiving the sensor signal and providing the output signal;
   first housing means for containing the sensor means and the converter means sealingly engaging the first circular sealing means and providing a passage for routing the process fluid to the diaphragm, the first housing means having a second circular sealing means having a larger circumference than the toroidal converter; and
   second housing means for containing the sensor means and the converter means sealingly engaging the second circular sealing means whereby the first and second housing means enclose the sensor means and the converter means.

2. The transmitter of claim 1 wherein the first and second housing means have peripheral rims which telescopically mate when the second housing means sealingly engages the first housing means.

3. The transmitter of claim 1 wherein each of the first and second housing means have integral pressure connection means formed thereon.

4. The transmitter of claim 1 wherein one of the housing means defines a terminal block chamber, and a conduit connecter means opening to the terminal block chamber to permit connecting wires from the exterior to the terminal block.

5. A pressure transmitter housing and flange combination comprising;
   a pair of cup-shaped housing sections, said cup-shaped housing sections having first end walls, and skirt portions forming interior chambers open at an opposite end from the first end walls;
   input manifold means formed in at least one of said end walls defining connection means for connecting a line from a source of pressure to be sensed thereto;
   said skirt on at least one of said housing sections defining a chamber of size to house electrical circuit components associated with a sensor to be mounted in said housing, with a circuit support extending annularly around the interior of the said support skirt, defining a central opening;
   said central opening being of size to receive a sensing cell, the first end walls engaging opposite ends of a sensing cell mounted in the housing when the housing sections are positioned together with the skirt portions of the housing sections adjacent to each other, and
   means to support said housing sections together with a sensing cell compressed between the housing section.

6. The apparatus as specified in claim 5 and means on the interior surface of each of the first end walls for engaging and compressively loading a sensing cell positioned between the first end walls when the housing sections are supported together.

7. The apparatus as specified in claim 5 wherein said inlet manifold means comprises a passageway extending laterally of at least one housing section and terminating in a port adapted to be connected to a pressure fitting.

8. The apparatus as specified in claim 7 wherein said housing section skirt portions each have complemental shoulders formed therein to permit the skirt sections to telescope together for a limited distance.

9. In a pressure transmitter for providing an output signal representative of an input pressure and having a pressure sensing cell, and circuitry for providing said output signal from signals received from the sensing cell, said sensing cell requiring loading along a central axis for supporting it under pressures when in use, the improvement comprising:

an integral housing and connecting flange assembly having two cup-shaped housing sections, at least one of the housing sections having means forming an input manifold having a connecting flange thereon, and passageways leading to the interior of said housing section, each of said housing sections having skirt portions defining a central chamber, and being adapted so that the skirt portions will fit together and surround the sensor, and said housing sections having end wall means adapted for loading the sensor when the housing sections are placed with the skirt portions fitted together, said end wall means further comprising shoulders formed on the interior surfaces of the end wall means, said shoulders fitting the opposite ends of the sensing cell when the housing sections are secured together; and means for securing the housing sections with the skirt portions fitted together.

10. The apparatus of claim 9 wherein the pressure sensing cell is a differential pressure sensing cell having pressure sensitive means at opposite ends thereof, and wherein both of the housing sections have integral manifolds thereof to provide pressure from different sources to the sensing cell.

11. The apparatus of claim 9 and means on the housing sections to receive a plurality of bolts extending between the housing sections to permit tightening the housing section together.

* * * * *